Oct. 17, 1961   M. D. EMERY   3,004,673
DISPLAY STANDS
Filed Aug. 25, 1958   2 Sheets-Sheet 1
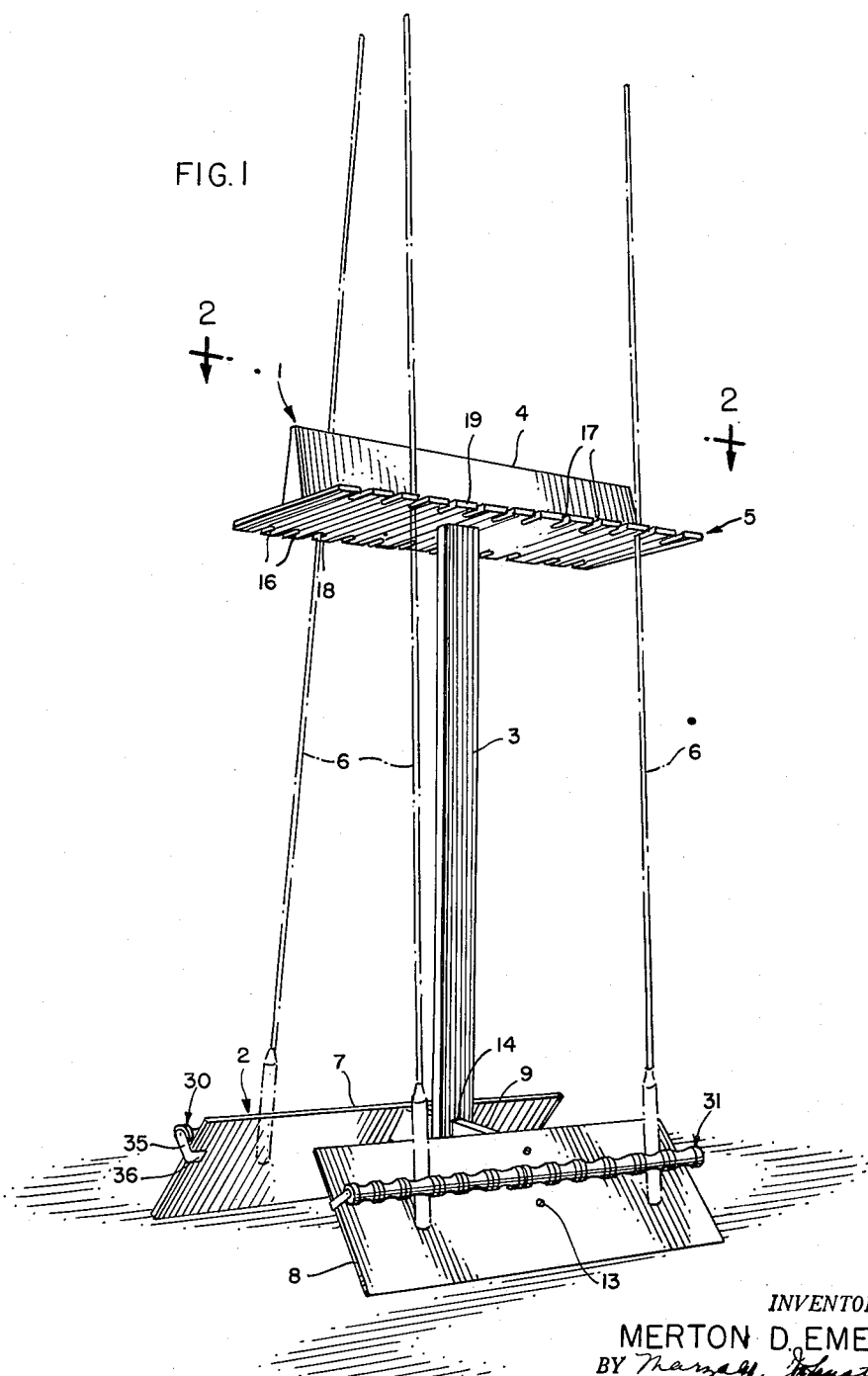
INVENTOR:
MERTON D. EMERY
BY
ATT'YS

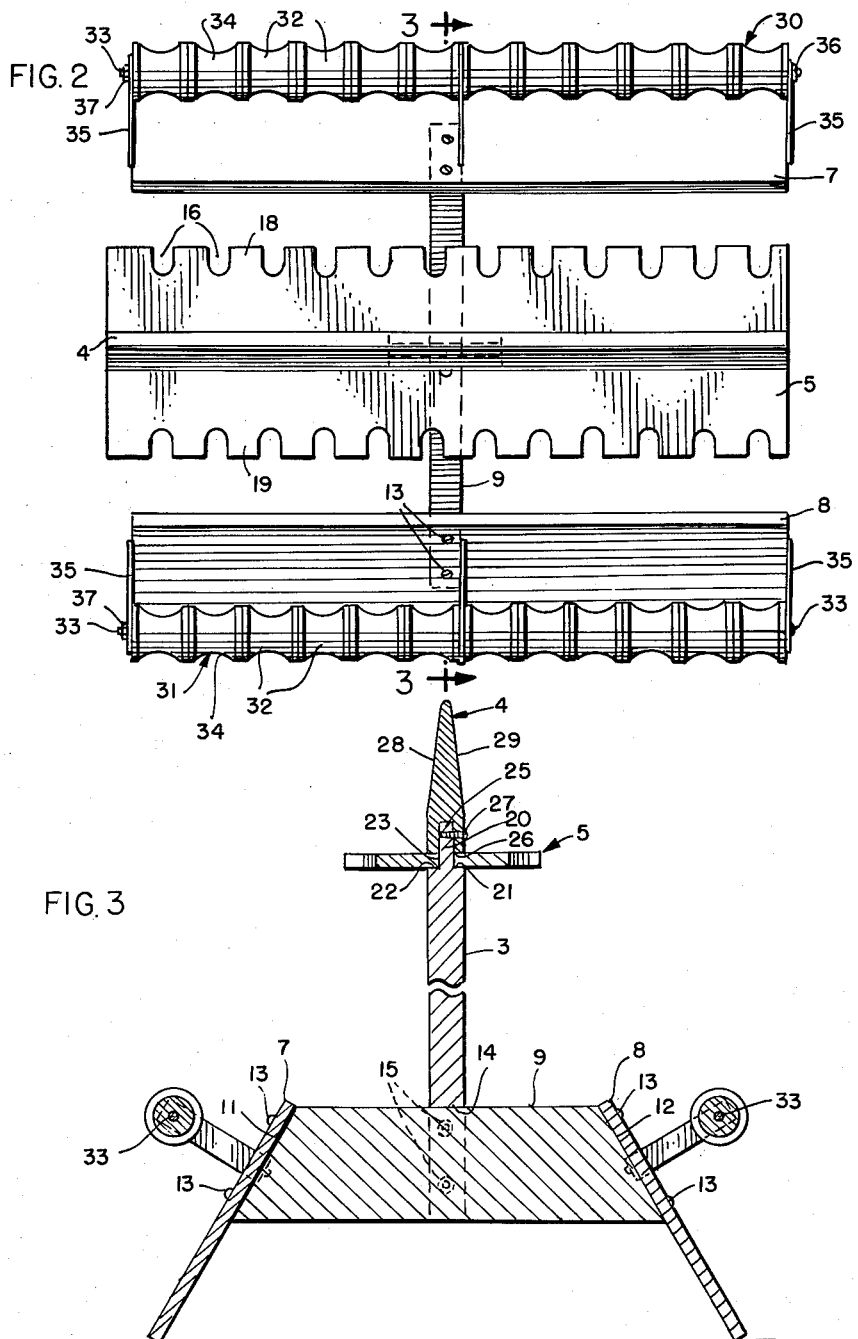

United States Patent Office 3,004,673
Patented Oct. 17, 1961

3,004,673
DISPLAY STANDS
Merton D. Emery, Grand Haven, Mich., assignor to Grand Haven Harbor Industries, Inc., Grand Haven, Mich., a corporation of Michigan
Filed Aug. 25, 1958, Ser. No. 756,804
1 Claim. (Cl. 211—60)

This invention relates to display stands and, more particularly, to display stands which are particularly well adapted for supporting fishing rods, and the like, in display position.

It is a primary object of my invention to afford a novel display stand for supporting fishing rods, and the like, in a novel and expeditious manner.

Another object of the present invention is to provide a novel display stand for fishing rods, and the like, wherein fishing rods may be securely and positively supported in upstanding display position while still permitting the rods to be quickly and easily removed from the display stand.

Another object is to provide a novel display stand of the aforementioned type wherein fishing rods, or the like, disposed thereon are firmly wedged in display position, in a novel and expeditious manner, merely by the insertion of the rod in the stand.

Another object is to afford a novel display stand of the aforementioned type wherein rollers may be incorporated therein to hold fishing rods, and the like, in a novel and expeditious manner.

A further object of the present invention is to afford a novel display stand wherein fishing rods, or the like, disposed in upstanding display position therein are firmly supported at their top and bottom portions.

Another object of the present invention is to afford a novel display stand wherein the parts thereof are so constituted and arranged that a display sign, or the like, may be readily incorporated therein in an attractive and practical manner.

An object ancillary to the foregoing is to provide a novel display stand of the aforementioned type wherein such a display sign may be quickly and easily removed and replaced.

Yet another object of the present invention is to provide a novel display stand of the aforementioned type which is compact and light in weight while affording space for a relatively large number of fishing rods, or the like, to be displayed thereon.

A further object is to afford a novel display stand of the aforementioned type which may be quickly and easily assembled and dissassembled even by relatively unskilled persons.

Another object of the present invention is to afford a novel display stand for fishing rods, and the like, which is practical and efficient in operation and may be readily and economically produced commercially.

Other and further objects of the present invention will be apparent from the following description and claim and are illustrated in the accompanying drawings which, by way of illustration, show the preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claim.

In the drawings:

FIG. 1 is a perspective view of a display stand embodying the principles of my invention;

FIG. 2 is a top plan view of the display stand shown in FIG. 1; and

FIG. 3 is a sectional view taken substantially along the line 3—3 in FIG. 2.

A display stand 1, embodying the principles of my invention, is shown in the drawings to illustrate the presently preferred form of my invention.

The display stand 1 embodies, in general, a base 2, an upright 3 mounted on the base 2 and projecting upwardly therefrom, a top panel or display panel 4 mounted on the upper end of the upright 3, and an upper supporting panel 5 mounted on the upper end portion of the upright 3 immediately below the top panel 4.

The display stand 1 is so constructed that fishing rods, or the like, such as, for example, the fishing rods 6 shown in phantom in FIG. 1, may be mounted on the base 2 in upstanding position wherein they rest against longitudinal edge portions of the supporting panel 5, the fishing rods being quickly and easily mounted in, and removed from, such display position as will be discussed in greater detail hereinafter.

The base 2 embodies two elongated flat panels 7 and 8 mounted on the opposite ends of an elongated, straight cross brace 9. The ends 11 and 12 of the cross brace 9, to which the panels 7 and 8, respectively, are secured by screws or bolts 13, slope downwardly and outwardly at acute angles to the vertical, FIG. 3, and the panels 7 and 8 are disposed in juxtaposition to the faces of the ends 11 and 12 so that they are also disposed at downwardly and outwardly sloping acute angles to the vertical.

The upright 3 is preferably an elongated straight member in the form of a post, or the like, of rectangular cross section, and has a downwardly opening slot or recess 14 formed in the lower end thereof, FIGS. 1 and 3. The recess 14 is of such size that, with the upright 3 disposed in normally vertically extending position, the cross brace 9 may be inserted into the recess 14 with a relatively snug fit. The upright 3 may be secured in such upstanding position on the cross brace 9 by suitable fastening means such as, for example, two screws or bolts 15 inserted through the upright 3 into the cross brace 9.

The upper supporting panel 5 is preferably a flat rectangular-shaped member having the same length as the panels 7 and 8, and having a width which is considerably less than the width of the base 2, FIG. 2. The panel 5 has a plurality of spaced notches or recesses 16 and 17 formed in the opposite longitudinal edge portions 18 and 19, respectively, the notches 16 and 17 being of such size as to freely receive therein the upper end portions of fishing rods, or the like, to be mounted in the stand 1.

The upper end portion of the upright 3 is reduced in cross section to afford an upstanding tongue 20 projecting upwardly from upwardly facing shoulders 21 and 22 disposed on opposite sides thereof, FIG. 3. The upper supporting panel 5 has a centrally disposed rectangular-shaped opening 23 therethrough which is complementary in size and shape to the tongue 20. The upper supporting panel 5 is normally mounted on the upper end portion of the upright 3 in flat horizontally extending position, with the tongue 20 projecting upwardly through the opening 23 therein, and with the panel 5 resting on the shoulders 21 and 22. When the panel 5 is disposed in this position, the longitudinal center line thereof is disposed in parallel relation to the longitudinal center lines of the panels 7 and 8, vertically above the longtiudinal center line of the base 2.

The top panel 4 is preferably of the same length as the panel 5 and has a recess 25 formed in one longitudinal edge portion 26 thereof, which is complementary in cross-sectional size and shape to the tongue 20. The top panel 4 is mounted on top of the supporting panel 5 with the longitudinal edge 26 disposed in juxtaposition to the upper face of the panel 5 and with the upper end portion of the tongue 20 disposed in the recess 25. The panel 4 may be secured to the tongue 20 in this position by suitable fastening means, such as a single screw 27, to thereby hold the panel 5 in position on the shoulders 21 and 22. When disposed in this position, the panel 4 extends along the longitudinal center line of the upper supporting panel 5, and is disposed in upright position thereon so that the opposite faces 28 and 29 thereof afford areas on which advertising, signs, or the like, may be effectively displayed.

Two elongated retaining bars 30 and 31 are mounted on the base 2 in outwardly spaced, parallel relation to the panels 7 and 8, respectively, FIGS. 2 and 3. Each of the retaining bars 30 and 31 embody a plurality of spools or rollers 32 rotatably mounted on a supporting rod 33. Each of the rollers 32 has a circumferentially extending groove 34 formed in the outer peripheral surface thereof, which is of such width and depth as to freely receive the butt end or handle of a fishing rod, or the like, to be mounted in display position on the stand 1, for a purpose which will be discussed in greater detail presently.

The retaining bars 30 and 31 are mounted on the panels 7 and 8, respectively, by respective pairs of brackets 35 secured to the panels 7 and 8 by suitable means such as screws 36, the end portions of each of the rods 33 being mounted in a respective one of the pairs of brackets 35. The rods 33 may be secured against longitudinal withdrawal from their respective pairs of brackets 35 by suitable means such as, for example, an enlarged head 36 formed on one end of each of the rods 33, and a nut 37 threaded onto the other end of each of the rods 33, FIG. 2.

The retaining bars 30 and 31 are also preferably of the same length as the panels 7 and 8, and are mounted on the base 2 in parallel relation to the edges 18 and 19 of the upper supporting panel 5. Also, each of the rollers 32 on the retaining rods 30 and 31 is disposed in radial alignment with a respective one of the recesses 16 and 17, respectively, in the upper supporting panel 5.

The panels 7 and 8, the retaining bars 30 and 31, and the upper supporting panel 5, are so constituted and arranged relative to each other that fishing rods such as the rods 6 shown in FIG. 1 may be mounted in upright position on the base 2 with the butt ends or handles thereof resting on the outer faces of the panels 7 and 8, respectively, and with the upper end portions of the rods leaning inwardly into notches 16 and 17 in the longitudinal edge 18 or 19, respectively, of the panel 5. When so disposed on the display stand 1, each rod is mounted on the base 2 in such position that the butt end thereof is disposed in the groove 34 of a respective one of the rollers 32 and the upper end portion of the rod is disposed in the corresponding recess 16 or 17 disposed on the same side of the upright 3 in radial alignment with that particular spool 32. The retaining bars 30 and 31 are so disposed relative to the panels 7 and 8, respectively, that when such a fishing rod is inserted into display position on the base 2 by moving or dropping the lower end of the fishing rod downwardly between one of the spools 32 and the adjacent panel 7 or 8, with the upper end of the fishing rod disposed in the corresponding recess 16 or 17, the retaining bar 30 or 31 is effective to wedge or clamp the fishing rod into abutting engagement with the outer face of the panel 7 or 8 and the longitudinal edge 18 or 19 within the recess 16 or 17, respectively. When a fishing rod is being so disposed in such position on the base 2, the roller 32 with which it is engaged rotates on its supporting rod 33 to thereby assist the fishing rod in its downward movement into such wedged position, the last mentioned roller 32 and the sloping outer face of the adjacent panel 7 or 8 cooperating to afford a camming action which is highly effective to wedge such a fishing rod into firmly retained position.

However, when it is desired to remove one of the fishing rods such as, for example, one of the fishing rods 6, from my novel display stand 1, it is only necessary to lift longitudinally upwardly on the fishing rod to thereby free it from the wedging engagement of the spool 32 and the panel 7 or 8 engaged therewith, and then move the upper end portion of the rod horizontally outwardly from the recess 16 or 17 in which it is disposed.

Thus, it will be seen that I have afforded a novel display stand wherein fishing rods, or the like, may be firmly and positively held in display position thereon so that if the display stand is bumped or moved, the rods are firmly held against dislodgement therefrom.

Also, it will be seen that with my novel display stand, fishing rods, or the like, may be quickly and easily mounted in and removed from display position therein.

Also, it will be seen that I have afforded a novel display stand which may be shipped in disassembled condition, and may be quickly and easily assembled even by relatively unskilled persons. Thus, for example, it will be seen that the panels 7 and 8, the cross brace 9, the upright 3, the upper supporting panel 5, and the top panel 4 may be disposed in disassembled condition relative to each other for packing and shipping purposes, but may be quickly and easily disposed in assembled condition relative to each other and secured in such position by merely inserting the four screws 13, the two screws 15, and the single screw 27, in their proper positions.

In addition, it will be seen that the top panel 4 affords an effective retaining member for the upper supporting panel 5, and also affords an attractive and effective display area for advertising, and the like.

Also, it will be seen that the top panel 4 may be quickly and easily removed and replaced if it should be desired to replace it for the purpose of changing the advertising on the display stand 1.

In addition, it will be seen that my novel display stand 1 is well adapted to be made out of any suitable material such as, wood, steel, aluminum, synthetic resinous material, and the like.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the appended claim.

I claim:

A display stand for fishing rods, and the like, comprising an elongated upright supporting member, two elongated base panels mounted on opposite sides of the lower end portion of said member and sloping downwardly and outwardly therefrom, an elongated flat supporting panel mounted in a horizontal plane on the upper end portion of said member and having two parallel longitudinal edges disposed on opposite sides of said supporting member in parallel relation to the longitudinal center lines of said base panels, said supporting panel having a plurality of spaced recesses in said edges, and two retaining bars mounted on respective ones of said base panels in outwardly and upwardly spaced parallel relation to said longitudinal center lines thereof, each of said bars comprising a plurality of circumferentially grooved elongated rollers mounted in axially aligned relation to each other with said grooves radially aligned with respective ones of said recesses, said bars being disposed further away from the longitudinal center line of said supporting member than the respective ones of said edges on the same side of said supporting member and closer to said last mentioned center line than the lower edge of said respective ones of said base panels in such position that such a fishing rod, disposed between one of said bars and said respective base panel with the lower end of said rod disposed in abutting engagement with the upper face of said base panel and with said rod engaged in respective ones of said grooves and recesses, is releasably clamped against said base panel and is disposed at a downwardly and outwardly opening acute angle to the vertical plane in which said respective longitudinal edge of said supporting panel is disposed.

References Cited in the file of this patent

UNITED STATES PATENTS

| | | | |
|---|---|---|---|
| 35,786 | Smith | July 1, | 1862 |
| 1,135,174 | Gibbs | Apr. 13, | 1915 |
| 1,636,608 | Kenyon | July 19, | 1927 |
| 1,748,843 | Kuckel | Feb. 25, | 1930 |
| 2,587,226 | Rodman | Feb. 26, | 1952 |
| 2,721,680 | Steckman | Oct. 25, | 1955 |
| 2,854,147 | Derr | Sept. 30, | 1958 |